United States Patent
Ichinose et al.

(10) Patent No.: US 7,288,295 B2
(45) Date of Patent: Oct. 30, 2007

(54) LIQUID CRYSTAL MEDIUM

(75) Inventors: Hideo Ichinose, Kanagawa Pref. (JP);
Yasushi Sugiyama, Atsugi (JP);
Takanori Takeda, Atsugi (JP);
Jeong-Hee Sung, Kanagawa-Pref. (JP);
Masako Nakamura, Yamatokoriyama (JP); Yoshito Hashimoto, Mie (JP);
Tsuyoshi Okazaki, Nara (JP);
Toshihiro Matsumoto, Nara (JP)

(73) Assignees: Merck Patent GmbH, Darmstadt (DE);
Sharp Corporation, Nara (JP)

( * ) Notice: Subject to any disclaimer, the term of this patent is extended or adjusted under 35 U.S.C. 154(b) by 132 days.

(21) Appl. No.: 11/286,320

(22) Filed: Nov. 25, 2005

(65) Prior Publication Data

US 2006/0115605 A1    Jun. 1, 2006

(30) Foreign Application Priority Data

Nov. 26, 2004  (EP) .................................. 040281958

(51) Int. Cl.
C09K 19/52 (2006.01)
C09K 19/12 (2006.01)
C09K 19/30 (2006.01)

(52) U.S. Cl. ............. 428/1.1; 252/299.01; 252/299.63; 252/299.66

(58) Field of Classification Search ................. 428/1.1; 252/299.01, 299.63, 299.66
See application file for complete search history.

(56) References Cited

U.S. PATENT DOCUMENTS

| | | | |
|---|---|---|---|
| 6,753,046 B2 * | 6/2004 | Manabe et al. | 428/1.1 |
| 2003/0064172 A1 * | 4/2003 | Tarumi et al. | 428/1.1 |
| 2003/0190436 A1 * | 10/2003 | Manabe et al. | 428/1.1 |
| 2003/0197153 A1 * | 10/2003 | Heckmeier et al. | 252/299.61 |

* cited by examiner

*Primary Examiner*—Shean C Wu
(74) *Attorney, Agent, or Firm*—Millen, White, Zelano & Branigan, P.C.

(57) ABSTRACT

Liquid crystal media based on a mixture of polar compounds of formulae I-VIII, their use for electro-optical purposes, and displays containing this medium, are described.

7 Claims, No Drawings

LIQUID CRYSTAL MEDIUM

The present invention relates to a liquid crystal medium, to its use for electro-optical purposes, and to displays containing this medium.

There is a great demand for LCDs (liquid crystal displays), in particular of the matrix type, that have very high specific resistance at the same time as a large working-temperature range, short response times even at low temperatures and low threshold voltage. In particular, LC media for TN (twisted nematic) display cells are required which facilitate the following advantages in the cells:

extended nematic phase range (in particular down to low temperatures)

the ability to switch at extremely low temperatures (outdoor use, auto-mobile, avionics)

increased resistance to UV radiation (longer service life).

For TN and STN (supertwisted TN) cells, LC media are desired which enable greater multiplexability, lower threshold voltages and broader nematic phase ranges, in particular at low temperatures. A further widening of the available parameter latitude (clearing point, smectic-nematic transition or melting point, viscosity, dielectric parameters, elastic parameters) is also desired.

For TV and monitor applications, LC media are desired which have a fast response time and a low threshold voltage, furthermore a good LTS (low temperature stability). Also, depending on the thickness of the switchable LC layer, a moderate or high birefringence may be required.

However, the LC media known in prior art have the disadvantage that they often do not allow all these requirements to be achieved simultaneously, without negatively affecting the other parameters of the LC cell.

The present invention has an aim of providing LC media, in particular for active matrix displays like those of the TFT (thin film transistor) type, and generally for TN or STN displays, which do not have the above-mentioned disadvantages or only do so to a reduced extent, and preferably simultaneously have very high specific resistances, low threshold voltages, an improved LTS and fast switching times. Another aim is to extend the pool of LC media available to the expert. Other aims will become evident to those in the art from the following description.

It has been found that these aims, for example, can be achieved if LC media according to the present invention are used in displays.

The present invention thus relates to an LC medium comprising, by weight:

15 to 25%, preferably 18 to 22% of one or more compounds of formula I, 5 to 15%, preferably 6 to 10% of one or more compounds of formula II, 1 to 10%, preferably 2 to 5% of one or more compounds of formula III, 1 to 8%, preferably 2 to 4% of one or more compounds of formula IV, 5 to 15%, preferably 8 to 12% of one or more compounds of formula V, 20 to 30%, preferably 22 to 27% of one or more compounds of formula VI, 20 to 30%, preferably 24 to 28% of one or more compounds of formula VII, 3 to 10%, preferably 4 to 8% of one or more compounds of formula VIII,

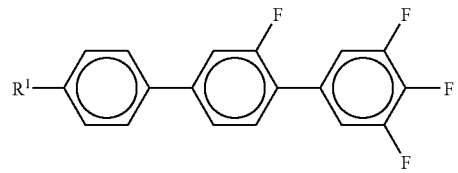

I

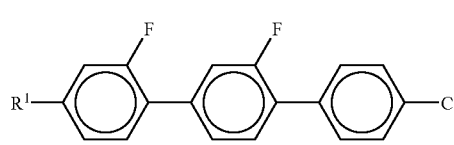

II

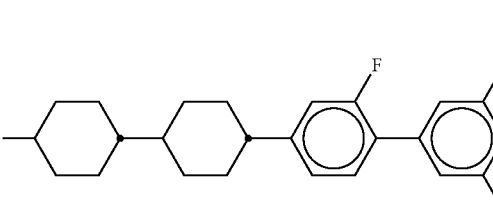

III

IV

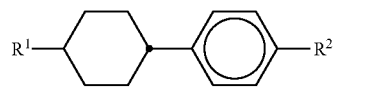

V

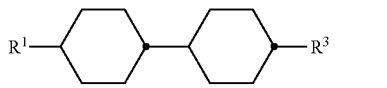

VI

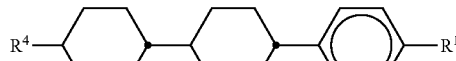

VII

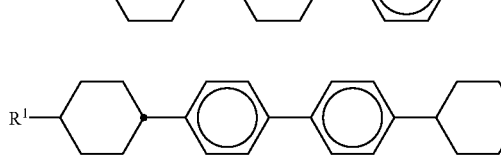

VIII in which $R^1$ and $R^5$ are independently of each other methyl, ethyl, n-propyl, n-butyl, n-pentyl or n-hexyl, $R^2$ is methoxy, ethoxy, n-propoxy, n-butoxy or n-pentoxy, $R^3$ is vinyl or 1E-propenyl, $R^4$ is vinyl or 3-butenyl.

Especially preferred is an LC medium comprising the following compounds

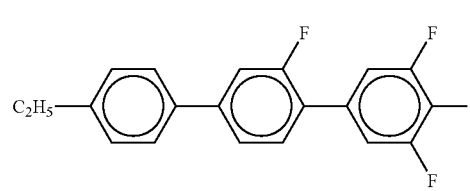

Ia

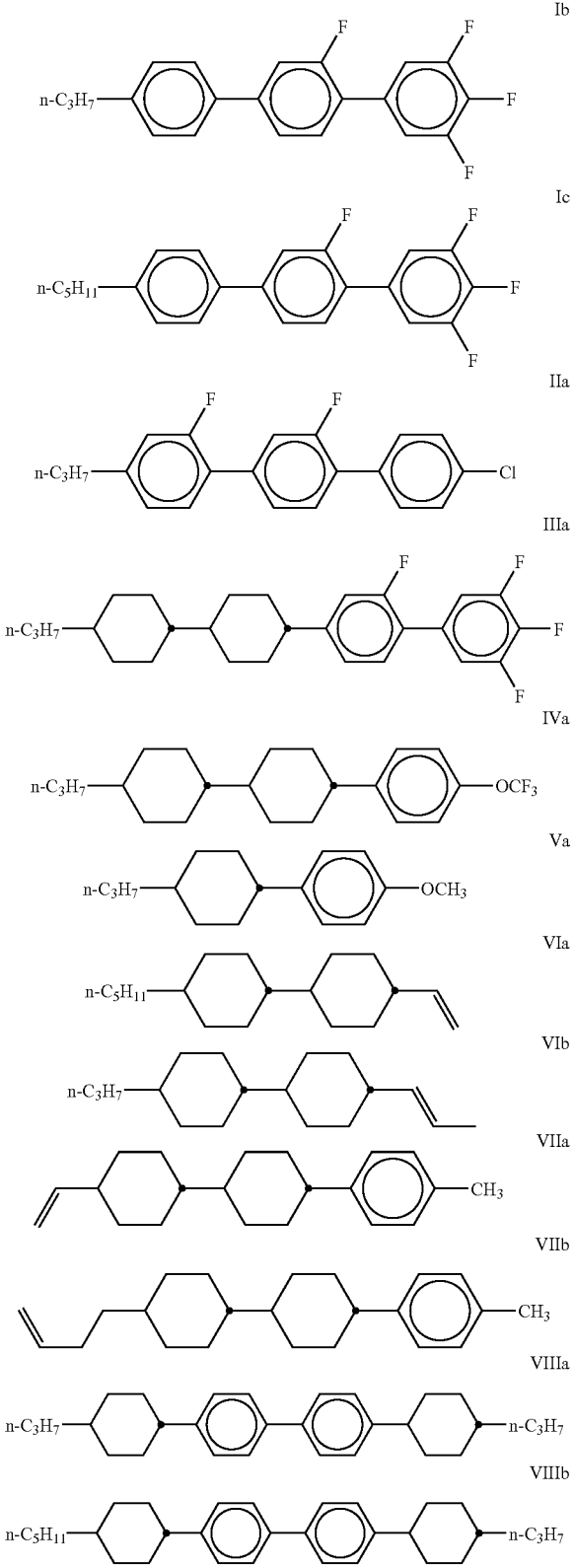

Further preferred is an LC medium comprising, by weight:

6 to 10 of compounds of formula Ia,
6 to 10% of compounds of formula Ib,
2 to 5% of compounds of formula Ic,
6 to 10% of compounds of formula IIa,
2 to 5% of compounds of formula IIIa,
2 to 4% of compounds of formula IVa,
8 to 12% of compounds of formula Va,
12 to 17% of compounds of formula VIa,
8 to 12% of compounds of formula VIb,
11 to 15% of compounds of formula VIIIa,
11 to 15% of compounds of formula VIIb,
2 to 4% of compounds of formula VIIIa,
2 to 4% of compounds of formula VIIIb.

In the pure state, the compounds of the formulae I-VIII are colorless and form liquid crystalline mesophases in a temperature range which is favorably located for electro-optical use. They are stable chemically, thermally and to light.

The compounds of the formulae I-VIII are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays which contain LC media of this type, and to the use of these LC media for electro-optical purposes. Very preferred are TFT displays having two plane-parallel outer plates, which, together with a frame, form a cell, integrated non-linear elements for switching individual pixels on the outer plates, and a nematic LC medium according to the present invention having positive dielectric anisotropy and a high specific resistance which is located in the cell.

The LC mixtures according to the invention enable a significant widening of the available parameter latitude. Especially, it was found that they have a fast switching time, low threshold voltage, good LTS, high specific resistance, high UV stability and high capacity holding ratio (HR) [as defined in S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)]. Also, the achievable combinations of clearing point, rotational viscosity $\gamma_1$, low $\Delta n$ and dielectric anisotropy are superior to materials known from prior art.

The construction of an LC display according to the invention, including polarisers, electrode base plates and surface-treated electrodes corresponds to the conventional construction for displays of this type. The term "conventional construction" covers all derivatives and modifications of the LC display, in particular including matrix display elements based on poly-Si TFT or MIM (metal-insulator-metal). A significant difference between the displays according to the invention and the conventional displays based on the TN cell consists, however, in the choice of the parameters of the LC layer.

The LC mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The LC media may also comprise further additives known to the person skilled in the art and described in the literature. For example, 0-15% by weight of pleochroic dyes, stabilizers or chiral dopants can be added. Suitable dopants and stabilizers are shown below.

In the present application and in the examples below, the structures of the components of the LC media are indicated by the following acronyms:

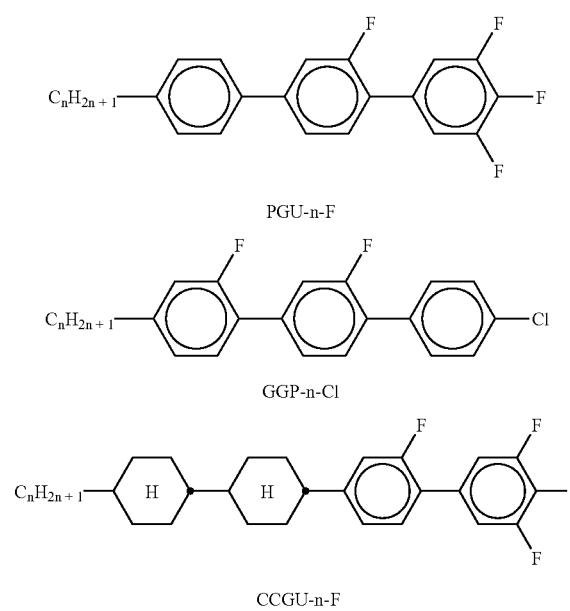

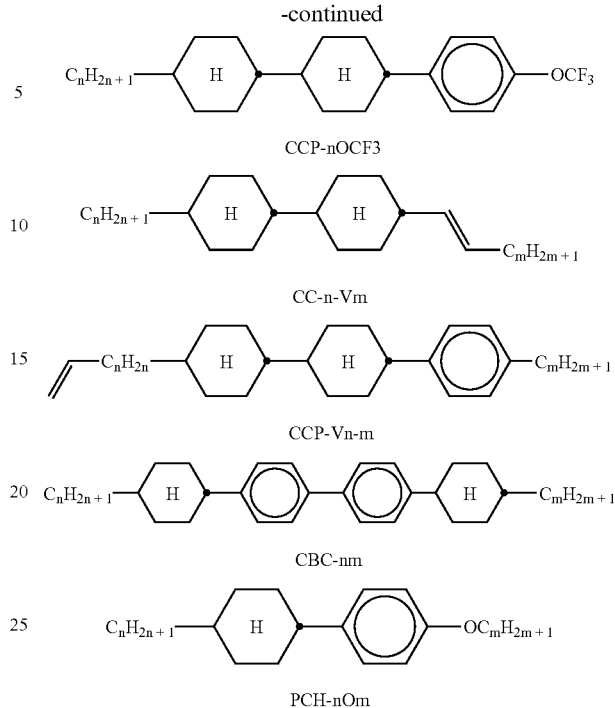

The following list shows possible chiral dopants that can be added to the LC media according to the present invention, preferably in proportions of from 0.1 to 10 wt.-%, very preferably from 0.1 to 6 wt.-%:

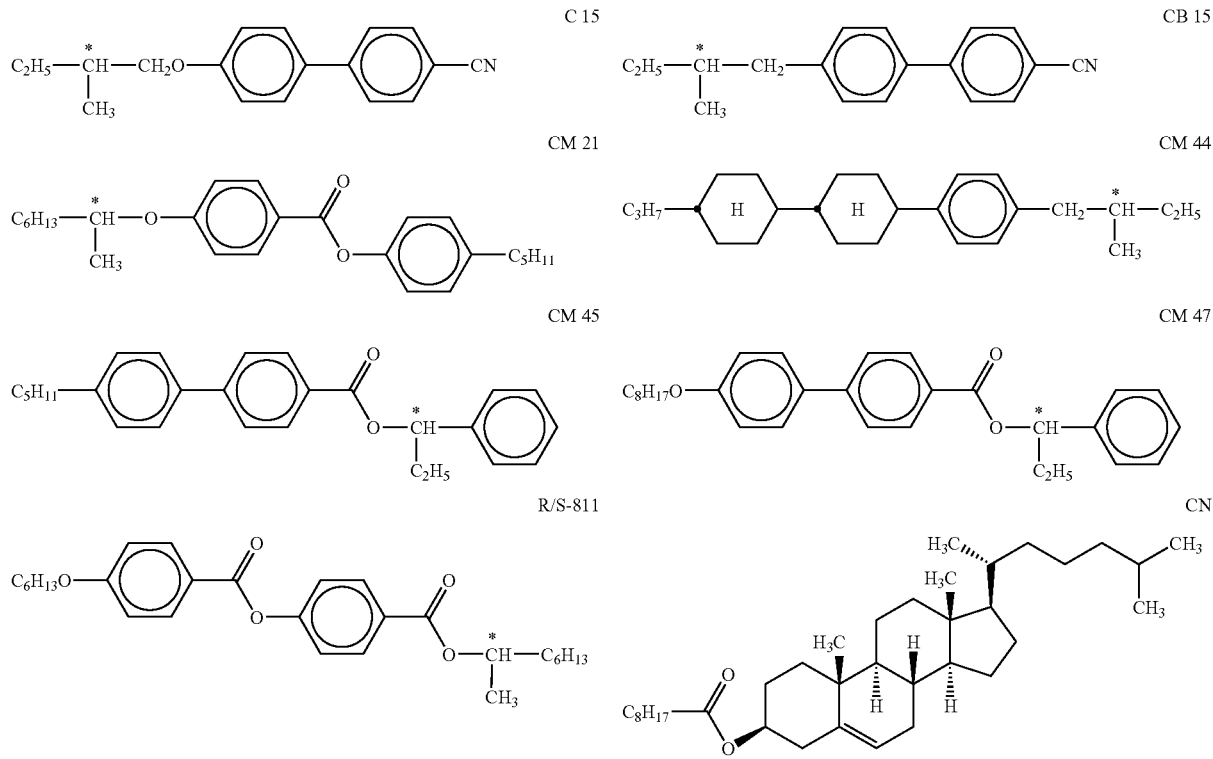

-continued
R/S-2011
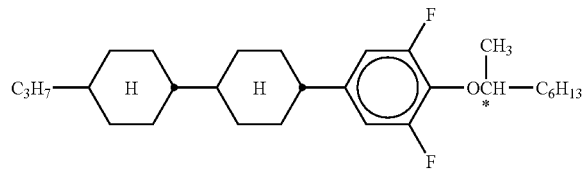
R/S-3011
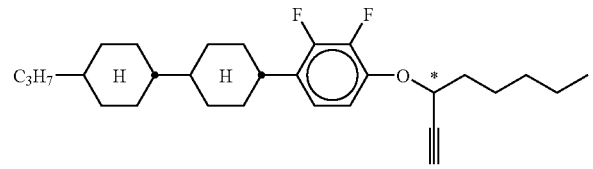
R/S-4011
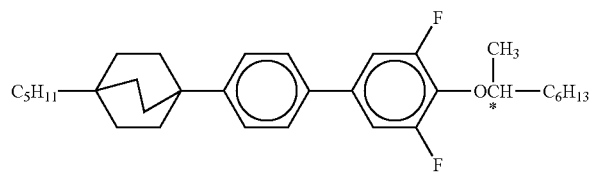
R/S-5011
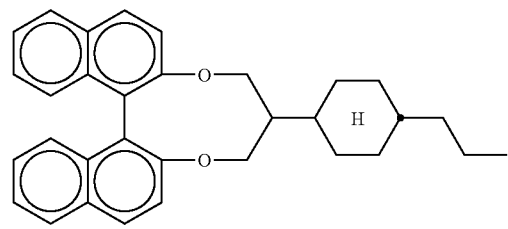
R/S-1011
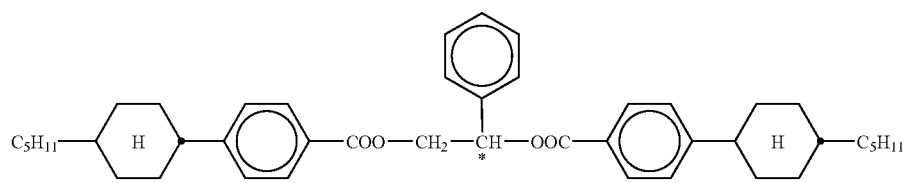
The following list shows possible stabilizers that can be added to the LC media according to the present invention:
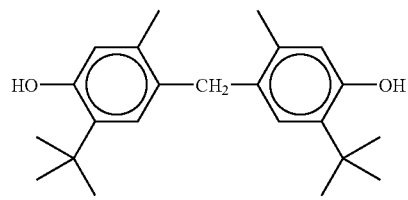
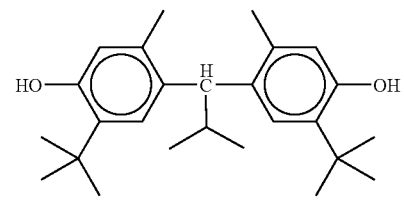
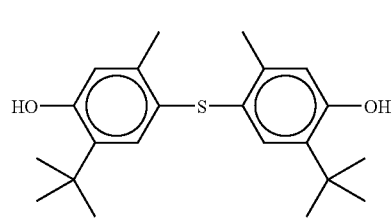
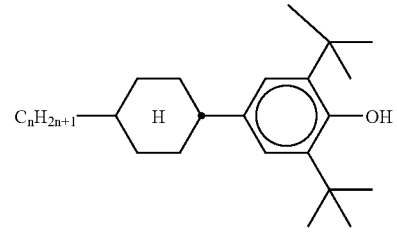
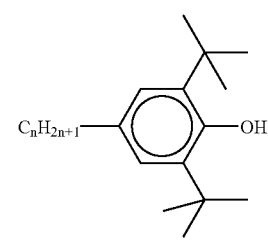
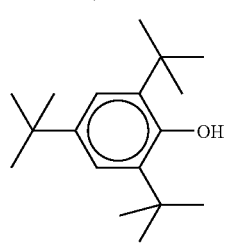
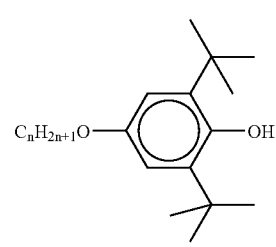
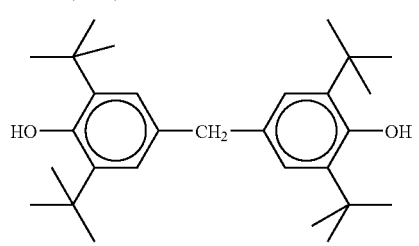

-continued
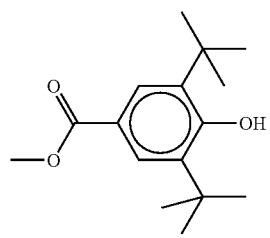
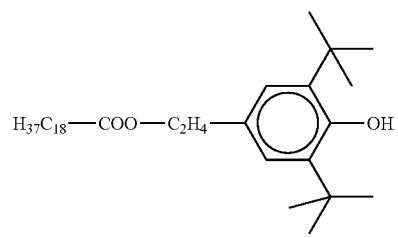
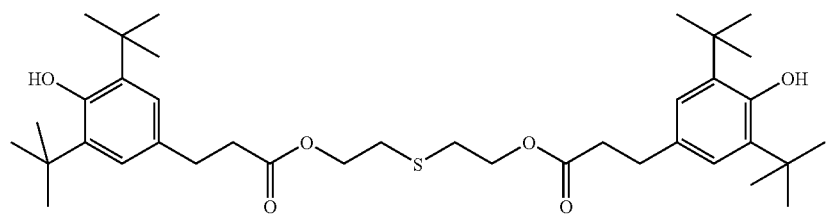
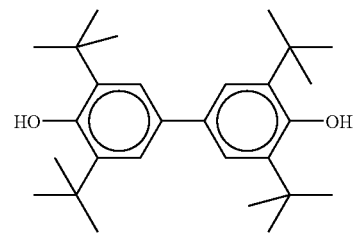
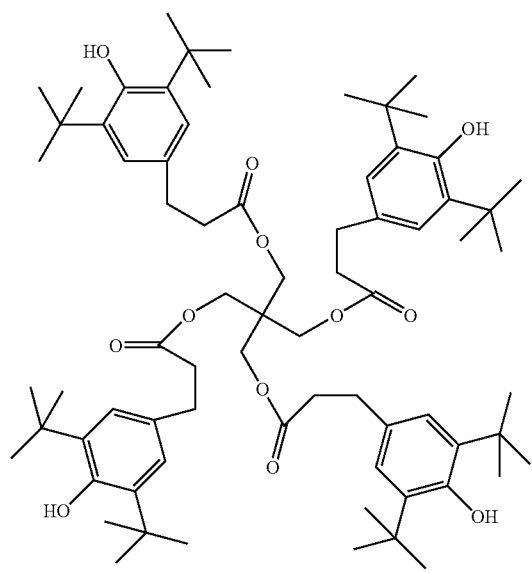
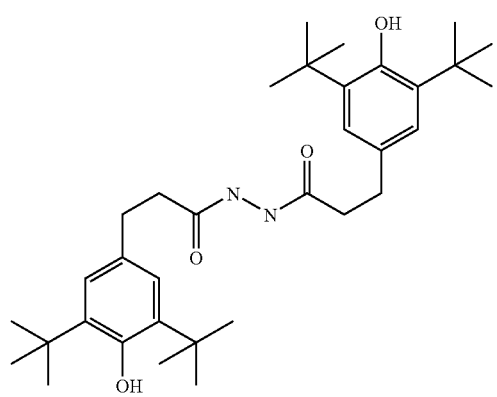
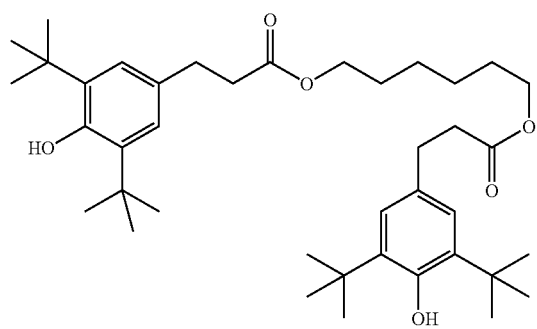
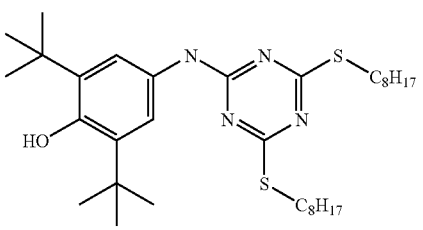

-continued
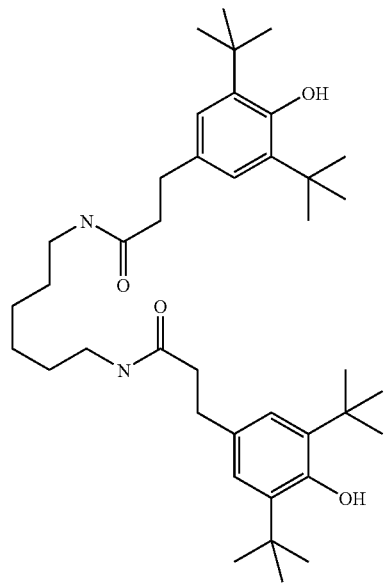
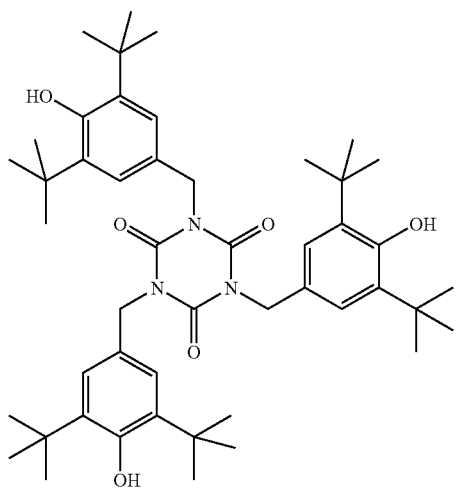
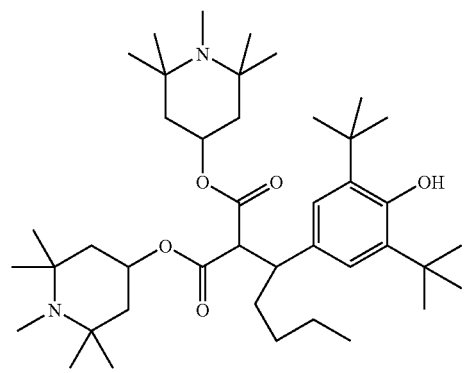
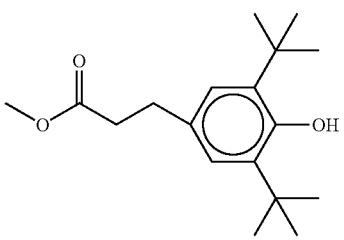
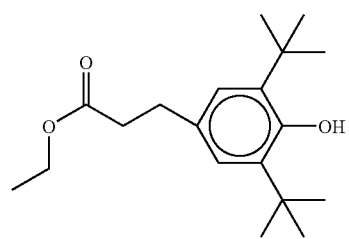
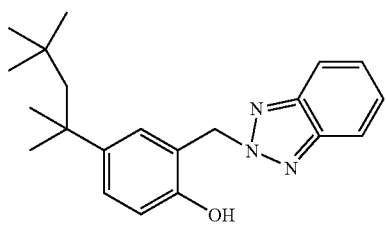
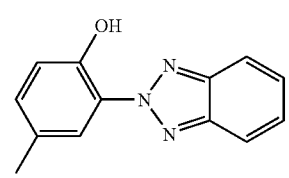
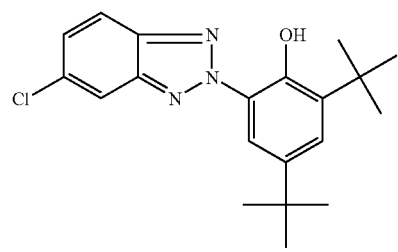
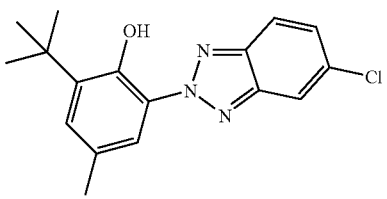

-continued
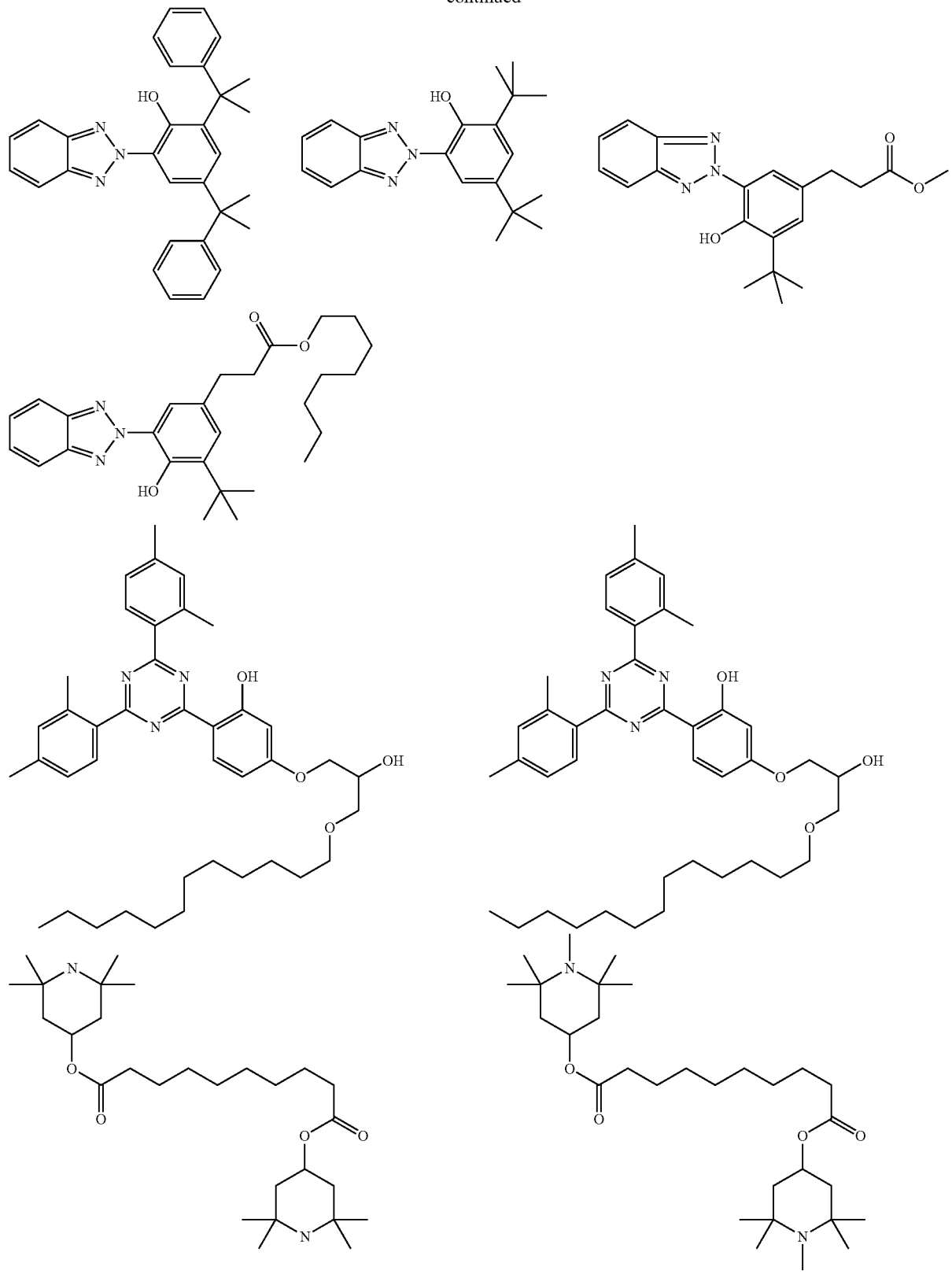
Above and below, percentages are percent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. Δn denotes the optical anisotropy and no the refractive index (589 nm, 20° C.). The flow viscosity $v_{20}$ (mm$^2$/sec) and the rotational viscosity $\gamma_1$ [mPa·s] were each determined at 20° C. $V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. Δε denotes the dielectric anisotropy (Δε=ε$_\|$−ε$_\perp$, where ε$_\|$ denotes the dielectric constant parallel to the longitudinal molecular axes and ε$_\perp$ denotes the dielectric constant perpendicular thereto). The electro-optical data were measured in a TN cell at the 1st minimum (i.e. at a d·Δn value of 0.5 μm) at 20° C., unless expressly stated otherwise. The optical data were measured at 20° C., unless expressly stated otherwise.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLE 1

| | | | |
|---|---|---|---|
| PGU-2-F | 8.00% | Clearing point [° C.]: | 106.2 |
| PGU-3-F | 8.00% | Δn [589 nm, 20° C.]: | 0.1304 |
| PGU-5F | 3.00% | Δε [1 kHz, 20° C.]: | 5.1 |
| GGP-3-Cl | 8.00% | ε$_\perp$ [1 kHz, 20° C.]: | 3.1 |
| CCGU-3-F | 3.50% | $V_{10}$ [V, 20° C.]: | 2.12 |
| CCP-30CF3 | 2.50% | $\gamma_1$ [mPa · s]: | 122 |
| PCH-301 | 10.00% | | |
| CC-5-V0 | 15.00% | | |
| CC-3-V1 | 10.00% | | |
| CCP-V0-1 | 13.00% | | |
| CCP-V2-1 | 13.00% | | |
| CBC-33 | 3.00% | | |
| CBC-53 | 3.00% | | |

The entire disclosure of all applications, patents and publications, cited herein and of corresponding Europe Application No. 04028195.8, filed Nov. 26, 2004, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditi

The invention claimed is:

1. A liquid crystal medium comprising, by weight:
15 to 25% of one or more compounds of formula I,
5 to 15% of one or more compounds of formula II,
1 to 10% of one or more compounds of formula III,
1 to 8% of one or more compounds of formula IV,
5 to 15% of one or more compounds of formula V,
20 to 30% of one or more compounds of formula VI,
20 to 30% of one or more compounds of formula VII,
3 to 10% of one or more compounds of formula VIII,

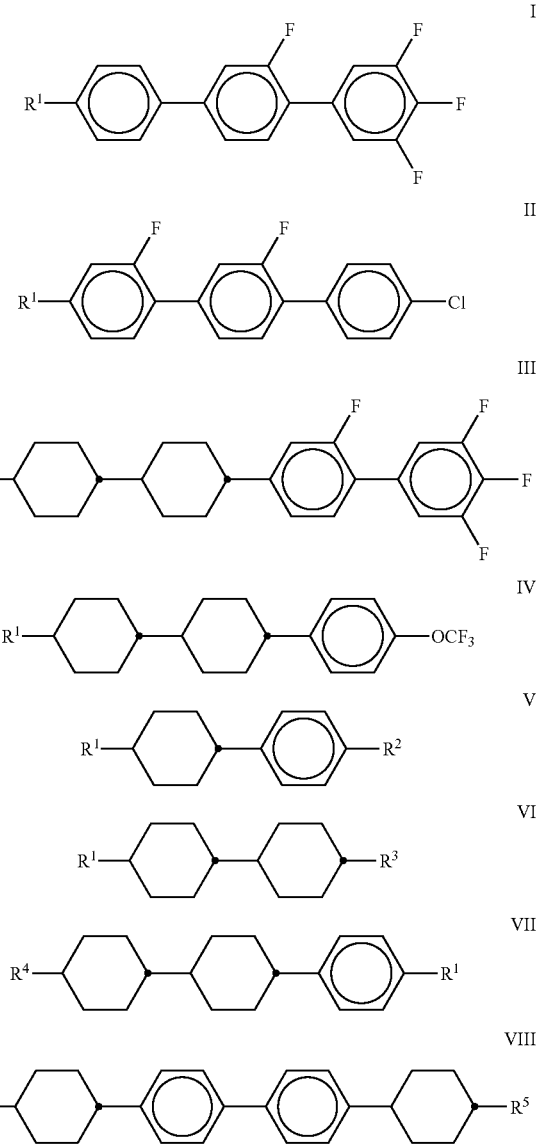

in which $R^1$ and $R^5$ are independently of each other methyl, ethyl, n-propyl, n-butyl, n-pentyl or n-hexyl, $R^2$ is methoxy, ethoxy, n-propoxy, n-butoxy or n-pentoxy, $R^3$ is vinyl or 1E-propenyl, $R^4$ is vinyl or 3-butenyl.

2. A liquid crystal medium according to claim 1, which comprises the following compounds

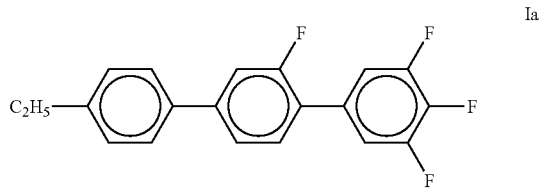

-continued

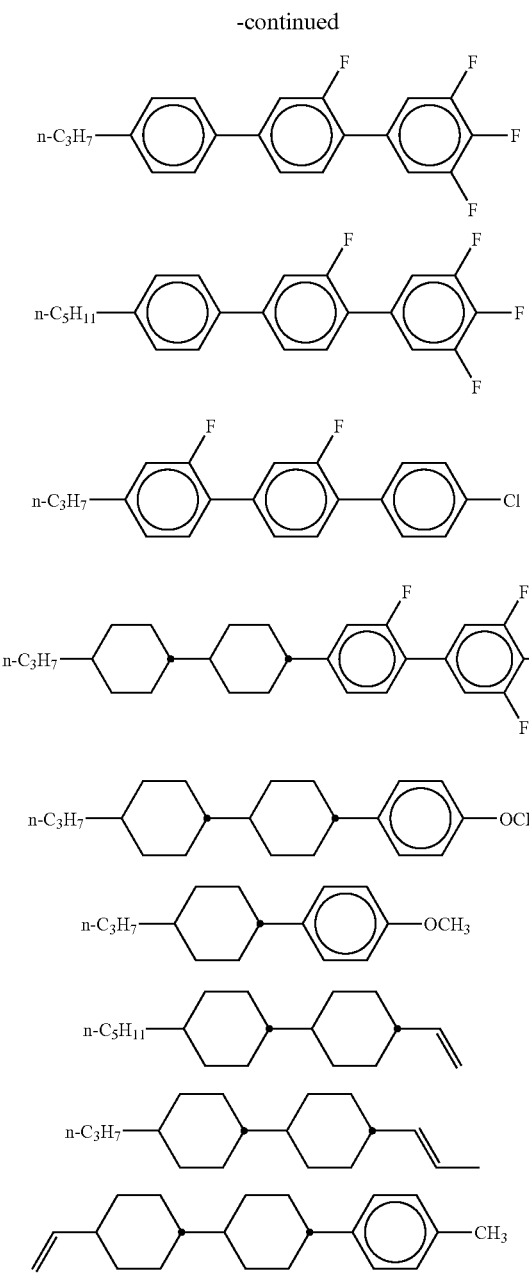

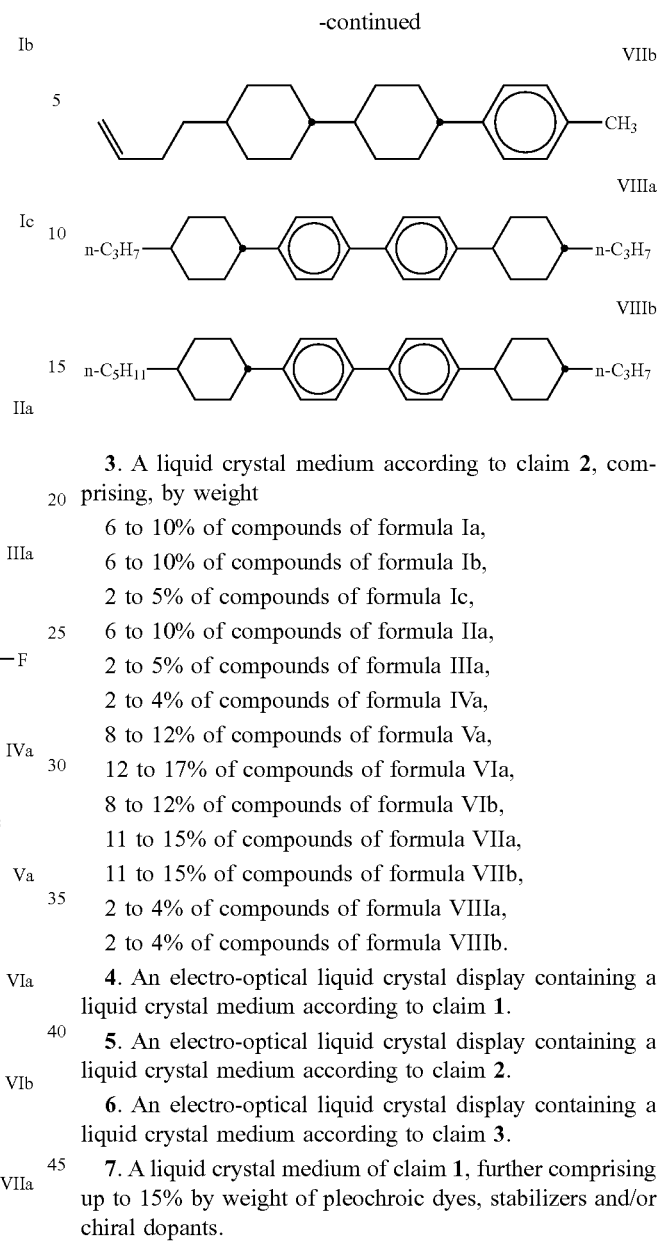

3. A liquid crystal medium according to claim 2, comprising, by weight 6 to 10% of compounds of formula Ia,
6 to 10% of compounds of formula Ib,
2 to 5% of compounds of formula Ic,
6 to 10% of compounds of formula IIa,
2 to 5% of compounds of formula IIIa,
2 to 4% of compounds of formula IVa,
8 to 12% of compounds of formula Va,
12 to 17% of compounds of formula VIa,
8 to 12% of compounds of formula VIb,
11 to 15% of compounds of formula VIIa,
11 to 15% of compounds of formula VIIb,
2 to 4% of compounds of formula VIIIa,
2 to 4% of compounds of formula VIIIb.

4. An electro-optical liquid crystal display containing a liquid crystal medium according to claim 1.

5. An electro-optical liquid crystal display containing a liquid crystal medium according to claim 2.

6. An electro-optical liquid crystal display containing a liquid crystal medium according to claim 3.

7. A liquid crystal medium of claim 1, further comprising up to 15% by weight of pleochroic dyes, stabilizers and/or chiral dopants.

* * * * *